(12) United States Patent
Norrby

(10) Patent No.: US 8,345,046 B2
(45) Date of Patent: Jan. 1, 2013

(54) METHOD FOR ADDING SHADOWS TO OBJECTS IN COMPUTER GRAPHICS

(75) Inventor: Peder Norrby, Stockholm (SE)

(73) Assignee: Trapcode AB (SE)

( * ) Notice: Subject to any disclaimer, the term of this patent is extended or adjusted under 35 U.S.C. 154(b) by 0 days.

(21) Appl. No.: 13/263,313

(22) PCT Filed: Mar. 22, 2010

(86) PCT No.: PCT/SE2010/050311
§ 371 (c)(1),
(2), (4) Date: Oct. 31, 2011

(87) PCT Pub. No.: WO2010/120227
PCT Pub. Date: Oct. 21, 2010

(65) Prior Publication Data
US 2012/0038645 A1   Feb. 16, 2012

Related U.S. Application Data

(60) Provisional application No. 61/170,122, filed on Apr. 17, 2009.

(30) Foreign Application Priority Data

Apr. 17, 2009   (SE) ....................... 0950252

(51) Int. Cl.
*G06T 15/00* (2011.01)

(52) U.S. Cl. .......................... 345/426; 345/419; 345/582

(58) Field of Classification Search .................. 345/419, 345/426, 582
See application file for complete search history.

(56) References Cited

U.S. PATENT DOCUMENTS
7,423,645 B2 * 9/2008 Dougherty et al. ........... 345/426

FOREIGN PATENT DOCUMENTS
EP      0916374 A2   5/1999
JP      2008-305241 A   12/2008

OTHER PUBLICATIONS

Dobashi et al (Interactive Rendering method for Displaying Shafts of Light, Proceedings Computer Graphics and Applications; Oct. 2000, pp. 31-37, 435.*
Li et al, Unified Volumes for Light Shaft and Shadow with Scattering, 2007 10th IEEE International Conference on Computer-Aided Design and Computer Graphics, Oct. 2007, pp. 161-166.*

(Continued)

*Primary Examiner* — Phu K Nguyen
(74) *Attorney, Agent, or Firm* — Schwegman Lundberg & Woessner, P.A.

(57) ABSTRACT

The invention relates to a method, computer program and device for automatically adding shadows to objects (2; 20) in a computer-generated scene (1). This is performed by calculating a first three dimensional [3D] position for a shadow object 5 (5; 50) based on a 3D position of a first original object (2; 20) and a 3D position of a first light source (3; 30), and adding a shadow object (5; 50) to said scene (1) at said first 3D position.

17 Claims, 9 Drawing Sheets

OTHER PUBLICATIONS

"International Application Serial No. PCT/SE2010/050311, International Preliminary Report on Patentability mailed Jul. 6, 2011", 14 pgs.

"International Application Serial No. PCT/SE2010/050311, International Search Report mailed Sep. 1, 2010", 4 pgs.

"International Application Serial No. PCT/SE2010/050311, Written Opinion mailed Sep. 1, 2010", 9 pgs.

Akenine-Möller, T., et al., *Real-Time Rendering*, (Second Edition, A. K. Peters, Ltd., Wellesley, MA), (202), pp. 102, 315-316.

Herndon, K. P., et al., "Interactive Shadows", *UIST: Proceedings of the Fifth Annual ACM Symposium on User Interface Software and Technology*, (Nov. 15-18, 1992), (1992), 1-6.

Loscos, C., et al., "Real-Time Shadows for Animated Crowds in Virtual Cities", *VRST 2001. Proceedings of the ACM Symposium on Virtual Reality Software and Technology*, (Nov. 15-17, 2001, Banff, Alberta, Canada), (2001), 85-92.

Woo, A., et al., "A Survey of Shadow Algorithms", *IEEE Computer Graphics & Applications*, (Nov. 1990), 13-32.

\* cited by examiner

METHOD FOR ADDING SHADOWS TO OBJECTS IN COMPUTER GRAPHICS

RELATED APPLICATIONS

This application is a nationalization under 35 U.S.C. 371 of PCT/SE2010/050311, filed Mar. 22, 2010 and published as WO 2010/120227 A1 on Oct. 21, 2010, which claims priority to Sweden Patent Application No. 0950252-7, filed Apr. 17, 2009, and to U.S. Provisional Application No. 61/170,122, filed Apr. 17, 2009; which applications and publications are incorporated herein by reference in their entirety.

TECHNICAL FIELD

The present invention relates to the field of computer graphics, and more particularly to a fast and simple method for object shadowing in computer graphics.

BACKGROUND

In the field of computer graphics, it is well known to generate shadows for objects illuminated by virtual light sources. This feature plays an important role in bringing realism to computer-generated images by enhancing the perceptibility of depth in a scene. In other words, shadows make it easier to understand what depth objects have and how they are located in relation to each other in space.

A scene is commonly defined as a number of three dimensional (3D) objects and light sources. A viewer views the scene from a point of view. The viewer is sometimes called a "camera". A scene is rendered into an image. In the field of computer graphics, rendering means to calculate an image. In this context, rendering is the process of computing an image depicting the scene as it would be seen from the viewer's (camera's) point of view. A motion picture or video can be created by rendering a plurality of consecutive images and moving the objects and/or the viewer/camera between the renderings.

There are computer programs available on the market for building scenes by allowing a user to insert 3D objects at 3D positions. There are other computer programs available on the market which automatically can add shadows to 3D objects. For example, there are computer programs allowing a user to assign a 3D object a position and to move a virtual light source in relation to that position so as to fictitiously illuminate the object from a desired direction. The computer program may then automatically generate a shadow of the object based on the shape of the object and the relative positions of the object and the virtual light source.

There are also computer programs for generating a plurality of objects in the form of small sized particles intended to animate snow, rain, water, smoke or the like. This type of computer programs are sometimes referred to as particle animation systems. An example of a particle animation system is Trapcode Particular™, developed by Trapcode AB. In a particle animation system the user assigns rules to a group of objects so that they do not need to be individually positioned and oriented. Instead, the computer calculates their position based on the assigned rules. In the case of motion picture and video, the computer calculates the position of the group of objects over time. Particle animation systems are hence useful for creating scenes with very many objects where it would be impractical to position each object individually. Each particle is assigned, by the computer program, a 3D position, and it may also be assigned other properties, such as velocity, orientation, rotational velocity etc. There are also particle animation systems allowing the user to insert light sources to the scene by specifying 3D positions for one or several light sources in the scene. Some particle animation systems even include functionality for adding shadow effects to a scene comprising light sources.

However, the task of automatically generating realistic shadows for objects in a scene is a complex task which typically requires a lot of computational power. Known computer programs offering this functionality use methods which are either too complex and make image rendering slow, especially for scenes with many objects, or which produce an unsatisfactory result making the rendered images look unrealistic.

There is hence a desire for a fast and simple method for realistic shadowing of objects in computer-generated scenes.

SUMMARY

It is an object of the present invention to provide a method for fast and simple shadowing of objects in computer-generated scenes.

This object is achieved by a method for automatically adding shadows to objects in a computer-generated scene, comprising the steps of:

calculating a first three dimensional (3D) position for a shadow object based on a 3D position of a first original object and a 3D position of a first light source; and adding a shadow object to said scene at said first 3D position.

By automatically adding a separate object, herein referred to as shadow object, to the scene at a first 3D position which is determined based on the 3D positions of an original object and a light source, a shadow object which will cause a realistic shadow effect in the image rendered from the scene can be automatically added for each original object/light source pair of the scene.

The first 3D position at which the shadow object is added is preferably calculated such that the shadow object is positioned behind said first original object from the light source's point of view, at an offset distance from the first original object. That is, the first 3D position may be calculated such that the shadow object is positioned along a (hypothetical) straight line passing through said first light source and said first original object, behind said first object from the light source's point of view in which case the offset distance is the distance between the first object and the shadow object along said straight line. Normally, each object and light source in a scene is assigned a 3D position by associating a "center point" of the object/light source with a single (x,y,z)-coordinate. The hypothetical straight line can then be calculated based on the known (x,y,z)-coordinates of the first original object and the light source, and the shadow object can be positioned by associating its "center point" with an (x,y,z)-coordinate located on the hypothetical straight line at an offset distance from the first original object. In this way, the shadow object is realistically positioned in relation to the original object and the direction of light, and the mathematical operation of calculating the first 3D position becomes very simple, thus reducing the computational power required to insert the shadow object into the scene.

Preferably, the shadow object is a two dimensional (2D) object, such as a circle, a rectangle, a triangle, a pentagon or any other 2D shape. Generating a 2D shape does not require as much computational power as generating a 3D shape and by generating the shadow object in form of a circle or another non-complex 2D shape the computational power requirements are further decreased, thus allowing the method to be quickly performed and/or to be performed by non high-capacity processing units.

Preferably, the 2D shape is soft-edged such that the shadow object "fades out" towards its periphery so that there are no sharp edges between the shadow objects and any original object or background onto which the shadow object is composited when rendering the scene into an image. According to a preferred embodiment of the invention, the shadow object is generated in form of a soft-edged circle. It has been found that shadow objects in form of soft-edged circles yields a very realistic shadow effect even in cases where the original objects have other, non-circular shapes.

The method may further comprise the step of setting an opacity for the shadow object to a certain opacity value. And/or it may comprise the step of setting a color of the shadow object to a certain color value. Preferably, the opacity value and/or the color value is calculated based on the above mentioned offset distance. Thereby, the opacity and/or color value can be calculated such that the opacity decreases and/or the color changes when the offset value increases. This feature has the effect that the shadow object will become less prominent when located far away from the original object causing it, which in turn will have the effect of a more realistic shadowing in the image into which the scene is rendered.

More advantageous features of the method will be described in the detailed description following hereinafter and the appended claims.

It is another object of the invention to provide a computer program product for fast and simple shadowing of objects in computer-generated scenes.

This object is achieved by a computer program for a device comprising a processing unit and a graphical rendering unit capable of generating a scene comprising at least a first original object and at least a first light source. The computer program comprises computer readable code which when run by the processing unit causes the device to perform the method described above.

According to another aspect of the invention, a computer program product is provided. The computer program product comprises a computer readable medium and computer readable code stored on the computer readable medium. The computer readable code is the above mentioned computer program. The computer readable medium may be a hard disk drive, a CD ROM, a DVD or any other computer readable medium known in the art.

According to yet another aspect of the invention, a device comprising calculation means and a graphical rendering unit capable of generating a scene comprising at least a first original object and at least a first light source is provided. The calculation means is adapted to calculate the first 3D position for the shadow object based on the 3D position of the first original object and a 3D position of the first light source, and the graphical rendering unit is adapted to add the shadow object to said scene at said first 3D position. The calculation means may be a processing unit, such as a microprocessor or the like, and the graphical rendering unit may, for example, be a Graphics Processing Unit (GPU).

The invention is particularly beneficial when used in particle animation systems where shadows for a large number of original objects in form of small-sized particles should be added in a scene. By simply offsetting a circle, preferably a soft-edged circle, at an offset distance from the particle for which a shadow is to be added, behind the particle from the light source's point of view, very few calculations have to be performed. Furthermore, drawing a circle having a certain radius at a certain 3D position is a very simple process which does not require any complex calculations to be performed by the processing unit or graphical rendering unit of the device performing the method.

Furthermore, the invention may be beneficially used when creating any type of motion pictures or video where computer-generated effects are added onto live-action footage. In this case the invention will make the computer-generated images look more real, more like a natural part of the footage, so that the effects becomes more believable for an audience. It may also be useful for enhancing perceptibility in motion pictures or video which do not include live-action footage, but rather are pure digital renderings.

The invention may also be beneficially used as a tool when creating virtual environments intended to simulate a real, physical environment. For example, the invention may be used by architects when designing a house; the architect may use the invention to help visualize the house in for example images, movies or even an interactive walk-through of the house. The shadows added by the invention will increase the perception of space and make the images look more realistic.

The invention could also be used in simulators, for example flight or car simulators. In this case the proposed method for adding shadows can help the pilot/driver to estimate the distances to objects in the virtual environment, and the positions of the objects relative to each other. In other words, the invention can enhance the driver/pilots perception of space.

Another exemplary field of application of the invention is computer games. Most modern computer games use 3D graphics. Since the present invention presents a very fast method for realistically adding shadows in 3D environments, it is advantageously used in real-time applications, such as computer games, to achieve realistic shadowing of virtual 3D worlds.

The invention could also be used in medical applications, for example for visualizing complex 3D structures, such as organs or molecules. Shadowing could be added for sake of clarity.

The invention is also advantageously used in software applications for mobile devices, such as mobile phones, personal digital assistants (PDAs), etc. In mobile devices, computational resources are often sparse and a minimum of calculations should be performed by the device to save energy. The present invention could be very useful for rendering realistically shadowed images in a fast and power efficient way.

BRIEF DESCRIPTION OF THE DRAWINGS

FIG. 5 illustrates an image rendered from a scene comprising nothing but original objects whereas FIG. 6 illustrates an image rendered from the same scene after adding shadow objects to the scene according to the principles of the invention;

DETAILED DESCRIPTION

Figure 1:
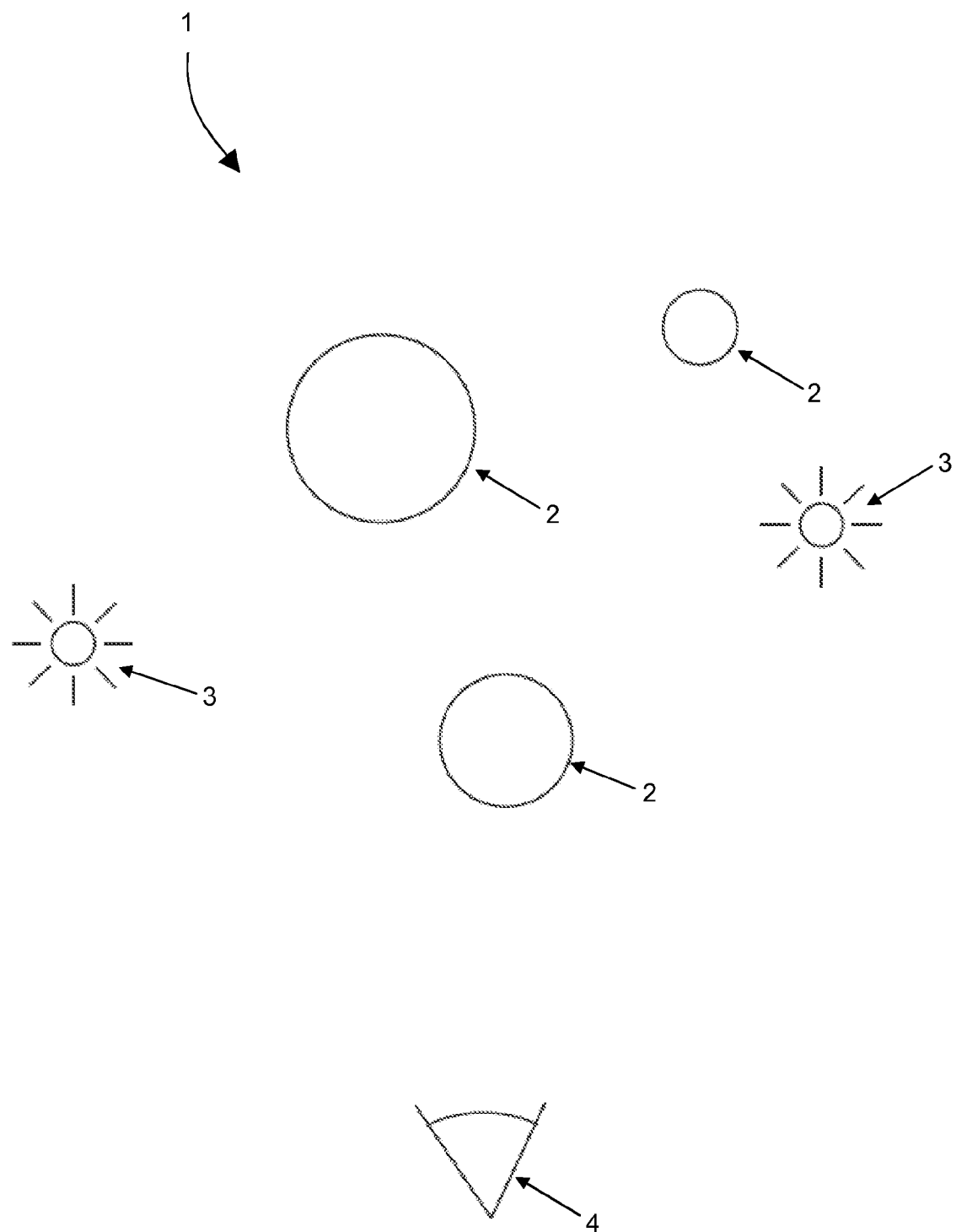
FIG. 1 illustrates an example scene and a viewer.

FIG. 1 illustrates a scene 1 containing original objects 2 and light sources 3, each having a three dimensional (3D) position. A viewer 4 views the scene 1 from a point of view which is also assigned a 3D position. In the field of computer graphics, the viewer (i.e. the 3D position from which the scene is to be viewed in the rendered image) is sometimes considered as a part of the scene and sometimes not. Hereinafter, the viewer 4 will not be regarded as a part of the scene 1. Instead, a scene will throughout this document be defined as a virtual 3D space comprising at least one original object 2 and at least one light source 3. The scene 1 is completely or partly generated by a computer running a computer program for generating 3D scenes.

The original objects 2 may be any type of objects. For example, an original object 2 may be a 3D model depicting any real or imaginary object such as a dog, a person, a spaceship, a sphere etc. It may also be a 2D object depicting any real or imaginary object such as a photo or an image of a person's face, a star, a letter, a circle, etc. An original object 2 may also be a particle in a particle animation system.

Each original object 2 and each light source 3 in the scene 1 is assigned a 3D position. The original objects 2 and light sources 3 may be positioned manually by a user of the computer or they may be automatically or semi-automatically positioned by the computer. There are several known methods for assigning the original objects 2 and light sources 3 their 3D positions and the exact method for doing so is out of the scope of this invention.

The original objects 2 of the scene 1 may be rendered by means of any known method capable of rendering objects in a 3D scene into an image. According to some aspects of the invention, there are specific demands on the object rendering method; for example it may be required that the method assigns a depth value and/or an alpha value for each pixel in the rendered image. When this is the case it will be clearly stated in the description.

Figure 2:
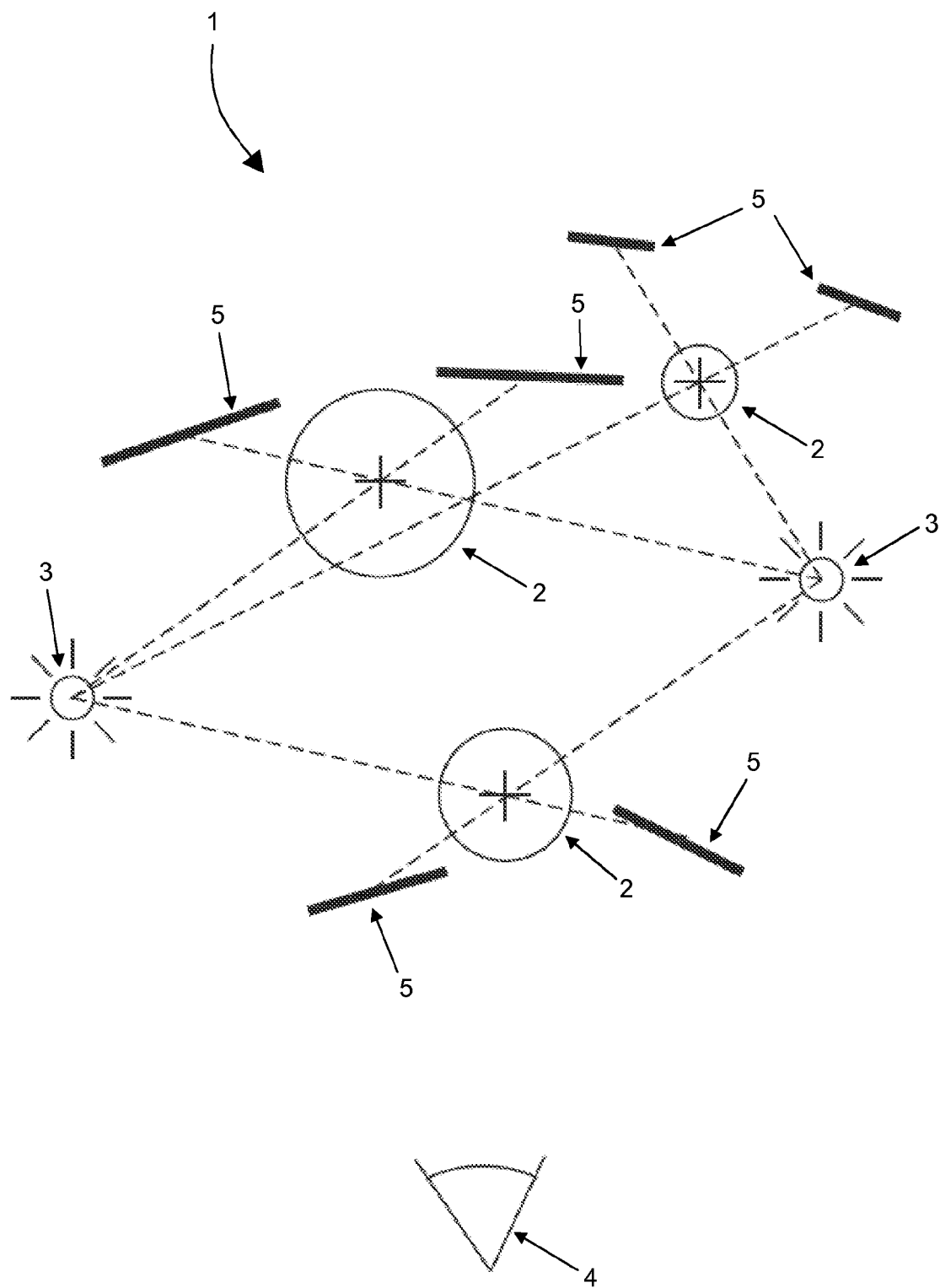
FIG. 2 illustrates the scene shown in FIG. 1 when shadow objects have been added to the scene according to the principles of the invention.

FIG. 2 illustrates the scene shown in FIG. 1 where shadows have been added according to an exemplary embodiment of the invention. The shadows are automatically generated and added to the scene 1 by the computer when running computer code instructing the computer to perform the method steps described below. It should thus be understood that the present invention typically is implemented as a computer program which, when run on a computer or any other device comprising a processing unit, such as a microprocessor, and a graphical rendering unit, such as a Graphics Processing Unit (GPU), causes the device to perform the method steps.

For each original object 2 and each light source 3 in the scene 1, a new object 5 that is an approximation of the original object 2 is added. The approximation associated with a certain original object 2 and a certain light source 3, i.e. a certain object/light source pair, is assigned a 3D position calculated based on the 3D position of the original object 2 and the 3D position of the light source 3. Hereinafter, the approximations of the original objects 2 will be referred to as "shadow objects".

When, in the following, using the term "all objects", reference is made to both original objects and shadow objects while the term "items" refer to all items of the scene, including both objects and light sources.

Figure 3:
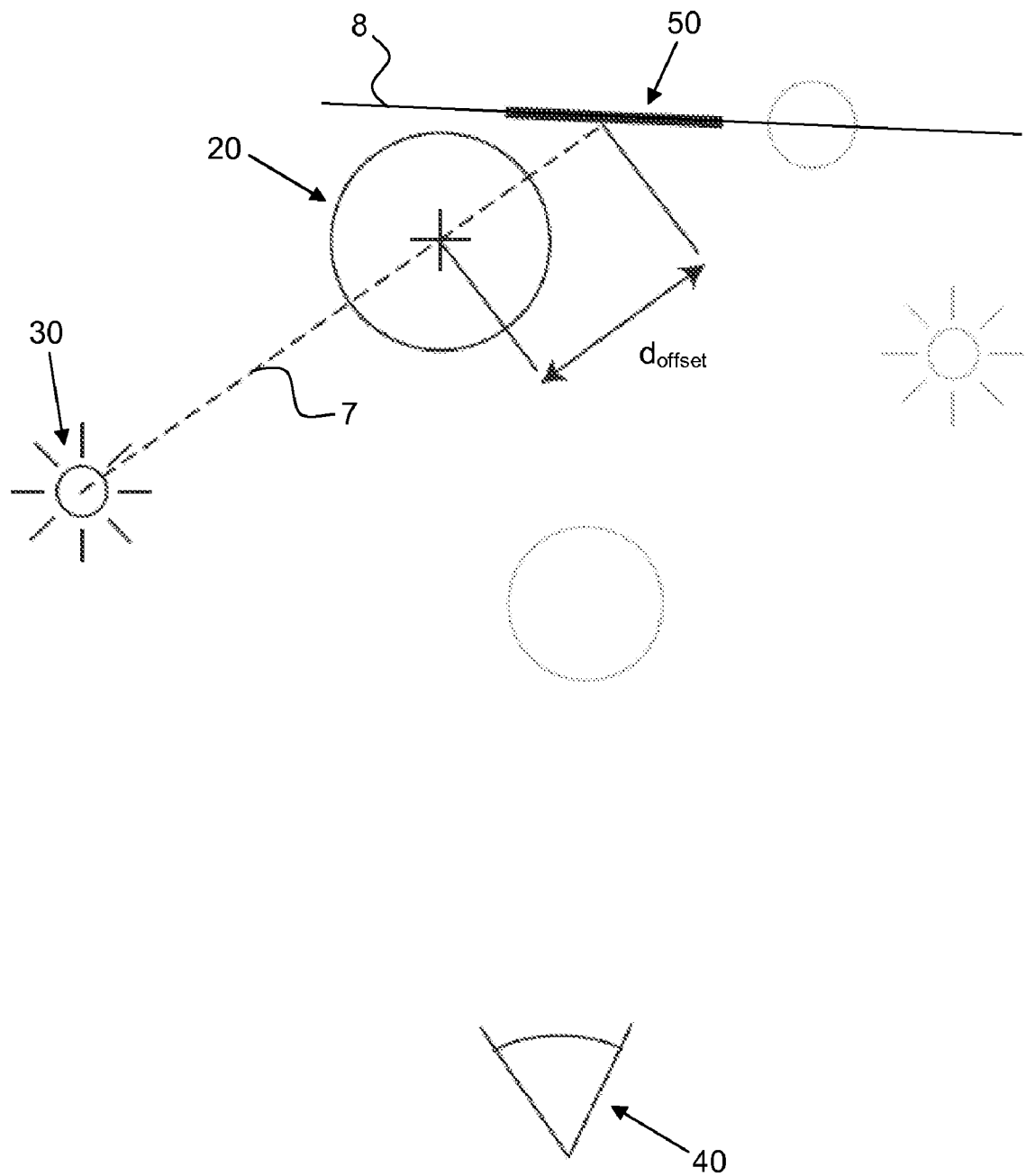
FIG. 3 illustrates an example of how a shadow object can be positioned in relation to an associated original object and light source according to the principles of the invention.

With reference now made to FIG. 3, the 3D position of the shadow object 50 is calculated by taking the 3D position of the original object 20 and offsetting in the direction of light from the 3D position of the light source 30. The amount of offset, hereinafter referred to as the offset distance, $d_{offset}$, may be a preset parameter, a parameter that can be specified by a user, and/or a parameter that can be automatically calculated by the computer based on the position and/or the size of the light source 30 and the original object 20. The offset distance may also be automatically calculated based on the positions of other objects in the scene as will be described in greater detail below.

In this embodiment of the invention, the center of the shadow object 50 is be placed at a point in space along a straight line 7 intersecting the center of the original object 20 and the center of the light source 30, at the offset distance from the original object 20, behind the original object 20 from the light source's point of view. In this exemplary embodiment, the offset distance is seen to be defined as the distance from the center of the original object 20 to the center of the shadow object 50. However, it should be understood that the offset distance may also be defined in other ways, for example as the distance between the point of the original object 20 and the point of the shadow object 50 that are located at the shortest distance from each other. It should also be appreciated that the "center" of an original object or a light source may be defined in many different ways. In the drawings, the original objects and light sources are illustrated as spheres for the sake of simplicity, in which case it would be natural to define the "center" of each object/light source as the center of the sphere. However, an original object or light source may have any given 2D or 3D shape and the center point of each original object or light source can be calculated according to any known principle for determining a point which may be considered as a "center point" of a 2D or 3D object. Typically, however, no calculations have to be performed to determine a center point of the original object 20 and light source 30 when generating the shadow object 50 since all items of the scene normally are assigned a 3D position in the form of a single (x,y,z)-coordinate when added to the scene. Thus, the original objects 20 and light sources 30 are normally already assigned a respective (x,y,z)-coordinate which can be considered as the center point thereof.

The shadow object 50 is typically generated in form of a 2D shape. Generating a 2D shape requires less computational power than generating a 3D shape. The shadow object 50 may be a simple soft-edged 2D approximation of the original object 20. Preferably, the shadow object 50 is generated in form of a soft-edged circle. In this exemplary embodiment in which the original object 20 is a sphere, a soft-edged circle is a very good approximation of the original object 20. However, shadow objects 50 is form of soft-edged circles have been found to result in a very realistic shadowing of the rendered image also when the original objects in the scene have other forms.

As seen in the embodiments shown in FIGS. 2 and 3, the 2D shadow objects 5, 50 always faces the viewer 4, 40. The shadow objects 50 can be said to be generated by projecting the original object 20 onto an imaginary plane 8 at a distance from the original object 50 given by the offset distance. The imaginary plane 8 and thus the two dimensional shadow object 50 is generated so as to always face the viewer 40, meaning that the inclination of the imaginary plane 8 is chosen such that the line of sight from the viewer 40 forms a normal to the projection plane 8, or at least forms a line that is substantially parallel to the normal of the projection plane 8. This type of image is often referred to as a billboard or sprite in the field of computer graphics. It should be understood that no additional calculations are required to make the 2D shadow object 50 face the viewer 40. When adding a 2D shape in a scene, it is automatically generated so as to face the position assigned to the viewer 40.

The size of the shadow object 50 may be determined in several different ways. According to one aspect of the invention the size of the shadow object 50 is simply set to a preset standard value. According to another aspect of the invention, the size of the shadow object 50 is set such that it becomes proportional to the size of the original object 20. In this case the constant of proportionality between the size of the original object 20 and the size of the shadow object 50 may be a user parameter. According to yet another aspect of the invention the size of the shadow object 50 is calculated based on the distance between the light source 30 and the original object 20. For example, the above mentioned constant of proportionality which may be used to set the size of the shadow object 50 in relation to the original object 20 may be determined based on this distance. In this case the constant of proportionality preferably increases with decreasing distance such that the shadow object 50 becomes big when the distance between the light source 30 and the original object 20 is small. When the distance increases, the constant of proportionality may converge towards 1 to give the viewer 40 the impression that light beams emitted by the light source 30 are substantially in parallel when striking the original object 20. Thereby, the shadowing of the scene 1B becomes more realistic and helps the viewer 40 to estimate the distances between the objects of the scene. Also, the shadow object 50 may be subject to perspective scaling, meaning that the size of the shadow object 50 will decrease as it moves away from the viewer 40. Thus, the size of the shadow object 50 may be calculated also based on the distance between the viewer 40 and the shadow object 50, which distance corresponds to the depth of the shadow object 50 in the scene as seen by the viewer 40.

The distance from the original object 20 at which the shadow object 50 is added, i.e. the offset distance, may, as mentioned above, be a preset parameter or a user-specified parameter. However, the offset distance may also be automatically calculated by the computer based on the known size of the original object 20 for which a shadow object is to be added. For example, in the scenario illustrated in FIG. 3 in which the offset distance is defined as the distance from the center of the spherical original object 20 and a center point of the shadow object 50, the offset distance can be calculated as the radius of the original object 20 plus, or multiplied by, a suitable value. By taking the size of the original object 20 into consideration when calculating the offset distance, one can assure that the shadow object 50 is positioned behind (from the light source's point of view) and not inside the original object.

Figure 4:
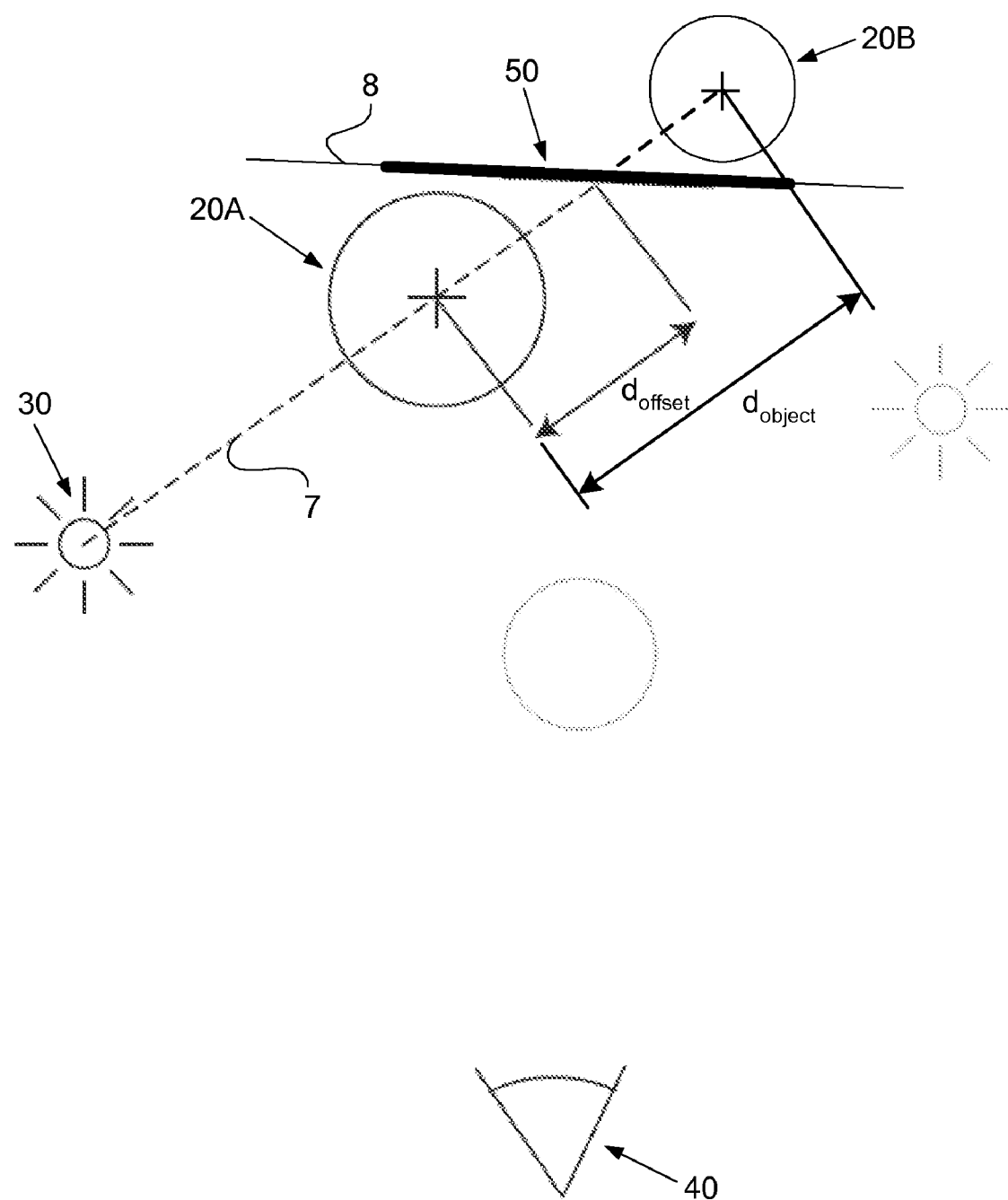
FIG. 4 illustrates an example of how a shadow object of a first illuminated original object can be positioned in relation to the first original object and a second original object located behind the first original object from the light source's point of view.

The offset value may also be calculated based on the sizes and/or 3D positions of other original objects in the scene. FIG. 4 illustrates a scene in which a second original object 20B is located behind a first original object 20A, from the light source's point of view. In this scenario, the offset distance can be calculated such that the shadow object 50 representing the shadow of the first original object 20A is positioned between the first original object 20A and the second original object 20B. That is, the offset distance, $d_{offset}$, can be calculated based on the distance, $d_{object}$, between the original object 20A for which the shadow object 50 is to be added and another original object 20B located behind the first original object 20A from the light source's point of view. Preferably, the offset value is calculated such that the shadow object 50 of the first original object 20A is positioned as close to the second object 20B as possible. Thereby, the shadow object 50 will most likely overlap the second original object 20B from the viewer's point of view and hence simulate a realistic shadow of the first original object 20A falling onto the second original object 20B when the scene, as seen by the viewer 40, is rendered into an image. As described above, the size of the first 20A and/or the second 20B original object may also be used when calculating the offset distance to make sure that the shadow object 50 is positioned between them and not "inside" any of them.

According to an aspect of the invention, the color and/or opacity of a shadow object 5, 50 is set based on the offset distance. Typically the color of a shadow object should be dark, for example black, grey or dark brown. However, by adjusting the color and/or opacity of the shadow objects 5, 50 based on their offset distances, a shadow object that is located close to its associated original object can be given an opacity and/or a color making it more prominent than a shadow object that is located far away from its associated original object. This may be achieved, e.g., by assigning an opacity value for each shadow object which is inversely proportional to its offset distance. This feature will make shadowing of the scene even more realistic.

Figure 5:
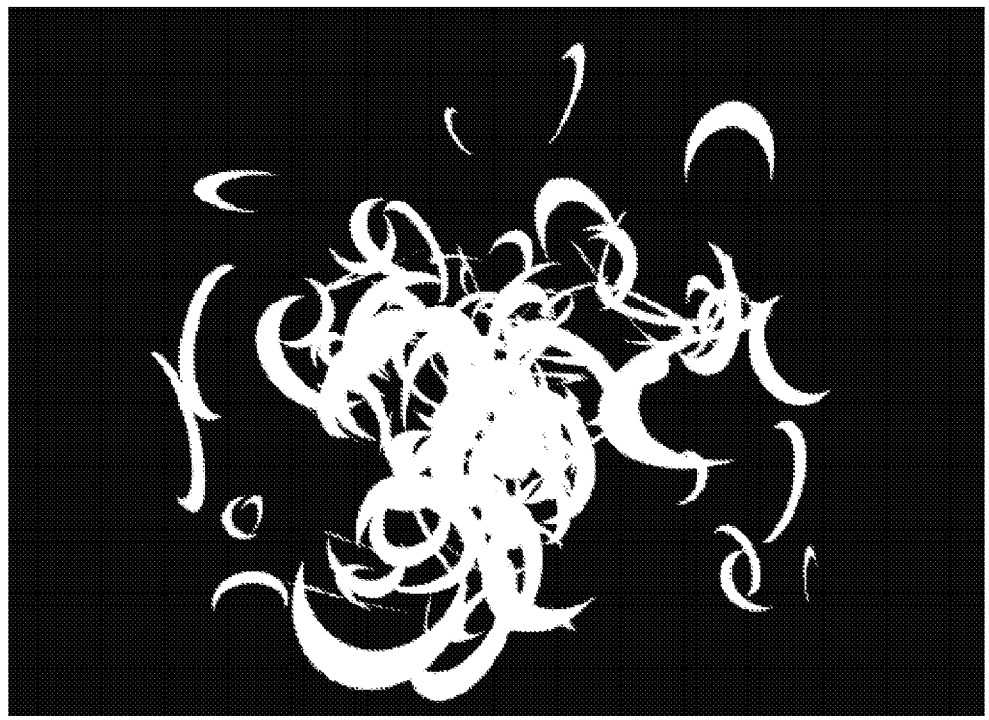
FIGS. 5 and 6 illustrate the effect of the method according to the invention.
Figure 6:
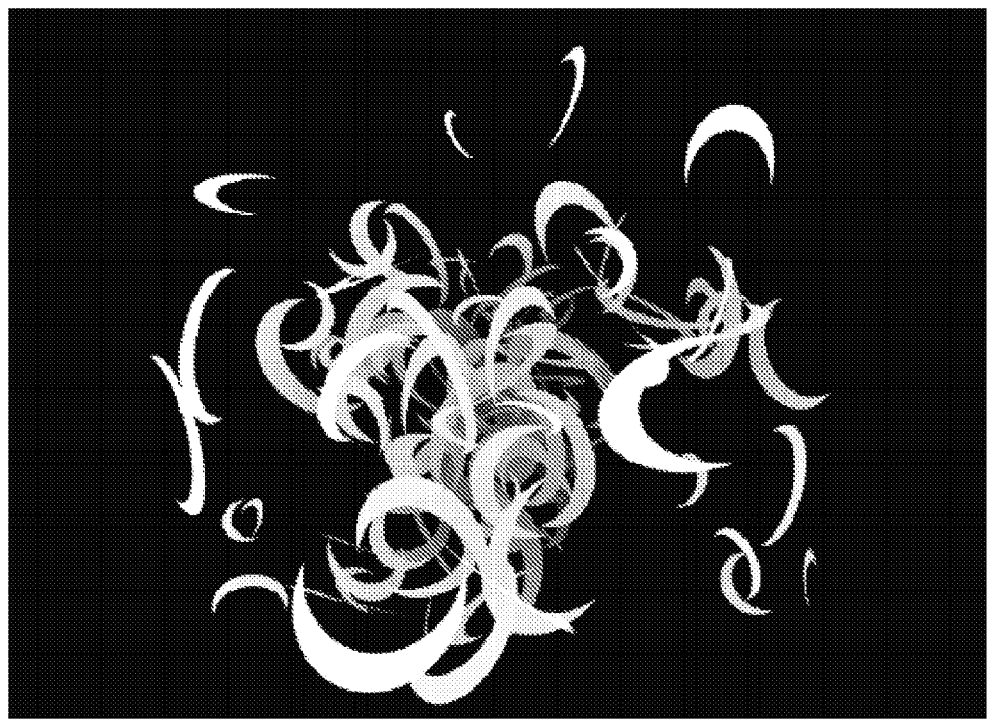

When rendering the scene 1 from the viewer's point of view after adding a shadow object 5, 50 for each original object/light source pair, the rendered image will contain shadowing. FIG. 5 shows an image rendered from a scene only comprising original objects (the crescent-shaped objects) while FIG. 6 shows an image rendered from the same scene but after adding shadow objects 5, 50 according to the principles of the invention.

In one embodiment of the invention, rendering of all objects is done in back-to-front order. Original objects 2, 20 are rendered into the destination buffer using any method that comprises setting an alpha value at each pixel. As well known in the field of computer graphics, a destination buffer is a rectangle of pixels, each pixel having a color (for example, the color may be given by specifying a red, a green and a blue component). An alpha value may also be assigned to each pixel; the alpha value describes how opaque that pixel is. When an image contains an alpha value for each pixel it is said to have an alpha channel.

According to this embodiment, shadow objects 5, 50 are rendered by, for each pixel of the shadow object 5, 50, compositing the pixel onto the corresponding destination buffer pixel while leaving the alpha value of the destination buffer pixel unchanged.

An advantage of this embodiment is that the alpha channel of the original objects 2, 20 remains unchanged, and, therefore, the resulting image buffer has a correct alpha channel. This allows the resulting image buffer to be composited onto a background, for example a video.

Another advantage is that a destination buffer pixel having an alpha value of zero when it is time to composite a shadow object pixel onto that destination buffer pixel (which will be the case for all destination buffer pixels which do not correspond to a pixel of an original object or a background located behind the shadow object from the viewer's point of view) will still have a alpha value of zero after the shadow object pixel has been composited thereon.

In other words, this way of rendering the objects ensures that a shadow object 5, 50 that is added to the scene only becomes visible in the rendered image in case there is an original object 2, 20 or a background behind the shadow object 5, 50 from the viewer's point of view. Or, to be more precise, that only the part of a shadow object 5, 50 overlapping an original object located behind the shadow object from the viewer's point of view will become visible in the rendered image.

In another embodiment of the invention, rendering of all objects is also done in back-to-front order. Original objects 2, 20 are rendered into the destination buffer using any method that comprises setting an alpha value and a depth value for each pixel.

As is well known in computer graphics, a depth value of a pixel indicates the depth of that pixel from the viewer's point of view. If the origin of a coordinate system is located at the viewer's point of view and the z-axis extends in the forward direction of the viewer, the depth value of a pixel is the z-coordinate of that pixel. An image that contains a depth value for each pixel is said to have a depth-channel, it may also be called depth-buffer or z-buffer.

According to this embodiment, shadow objects 5, 50 are rendered by, for each pixel of the shadow object:
multiplying the alpha value of the shadow object pixel with an intensity value, and
compositing the shadow object pixel onto the corresponding destination buffer pixel while leaving the alpha of the destination buffer pixel unchanged, the intensity value being a function of the distance between the depth of the shadow object pixel and the depth of the corresponding destination buffer pixel.

By multiplying the alpha value of the shadow object pixel with an intensity value that depends on the distance between the depth of that shadow object pixel and the depth of the corresponding destination buffer pixel, the shadows in the rendered image can be made to fade out with depth so that an original object close to the viewer will not shadow another original object that is far away from the viewer. This will be the result if the intensity value decreases when the distance increases. Hereinafter, the distance between the depth of a shadow object pixel and the depth of the corresponding destination buffer pixel will be referred to as the Depth Difference (DD) distance between these pixels.

Figure 7:
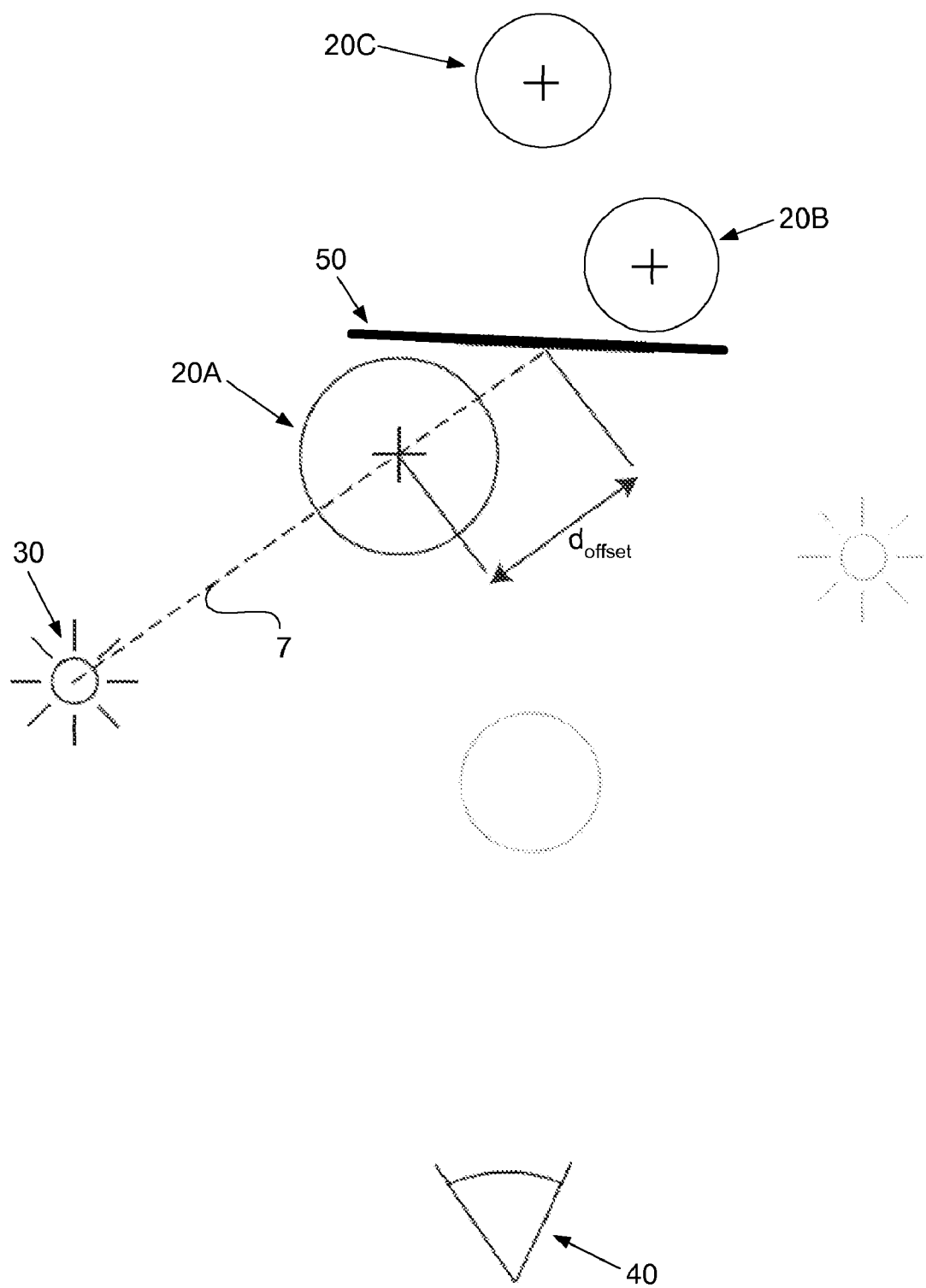
FIG. 7 illustrates a part of an exemplary scene.

With reference now to FIG. 7, the first 20A and second 20B original objects shown in FIG. 4 are shown together with a third original object 20C. The effect of the above described multiplication with the intensity value is that the part of the shadow object 50 which overlap with the second original object 20B from the viewer's point of view will be more intensely depicted and hence more prominent in the rendered image than the part of the shadow object 50 that overlap with the third original object 20C from the viewer's point of view. Basically, this image rendering method ensures that the shadow caused by the shadow object 50 in the rendered image appears more "intense" when falling on an original object that is close in depth to the shadow object than when falling on an original object that is distant in depth from the shadow object. This will make the shadowing in the rendered image look even more realistic.

Preferably, the intensity value is set to zero if DD distance exceeds a certain threshold value given by a parameter which hereinafter will be referred to as Max_DD_distance. The Max_DD_distance parameter may be a preset parameter, a user-specified parameter or a parameter whose value is automatically calculated and set by the computer. This has the effect that even if an original object is positioned behind a shadow object from the viewer's point of view, the shadow object will not affect the visual appearance of the original object in the rendered image if the distance in depths between the shadow object and the original object is long enough. With reference once again to the scene shown in FIG. 7, this means that the shadow object 50 will not affect the visual appearance of the original object 20C at all when rendering the scene into an image if the distances in depth between all pixels of the shadow object 50 and all pixels of the third original object 20C exceed Max_DD_distance.

For example, the intensity value can be set to zero if DD distance exceeds Max_DD_distance and to the difference between Max_DD_distance and DD distance divided by Max_DD_distance if not exceeding Max_DD_distance. That is, the intensity value may be defined as follows:

If $DD$ distance>Max_$DD$_distance→intensity value=0

Figure 8:
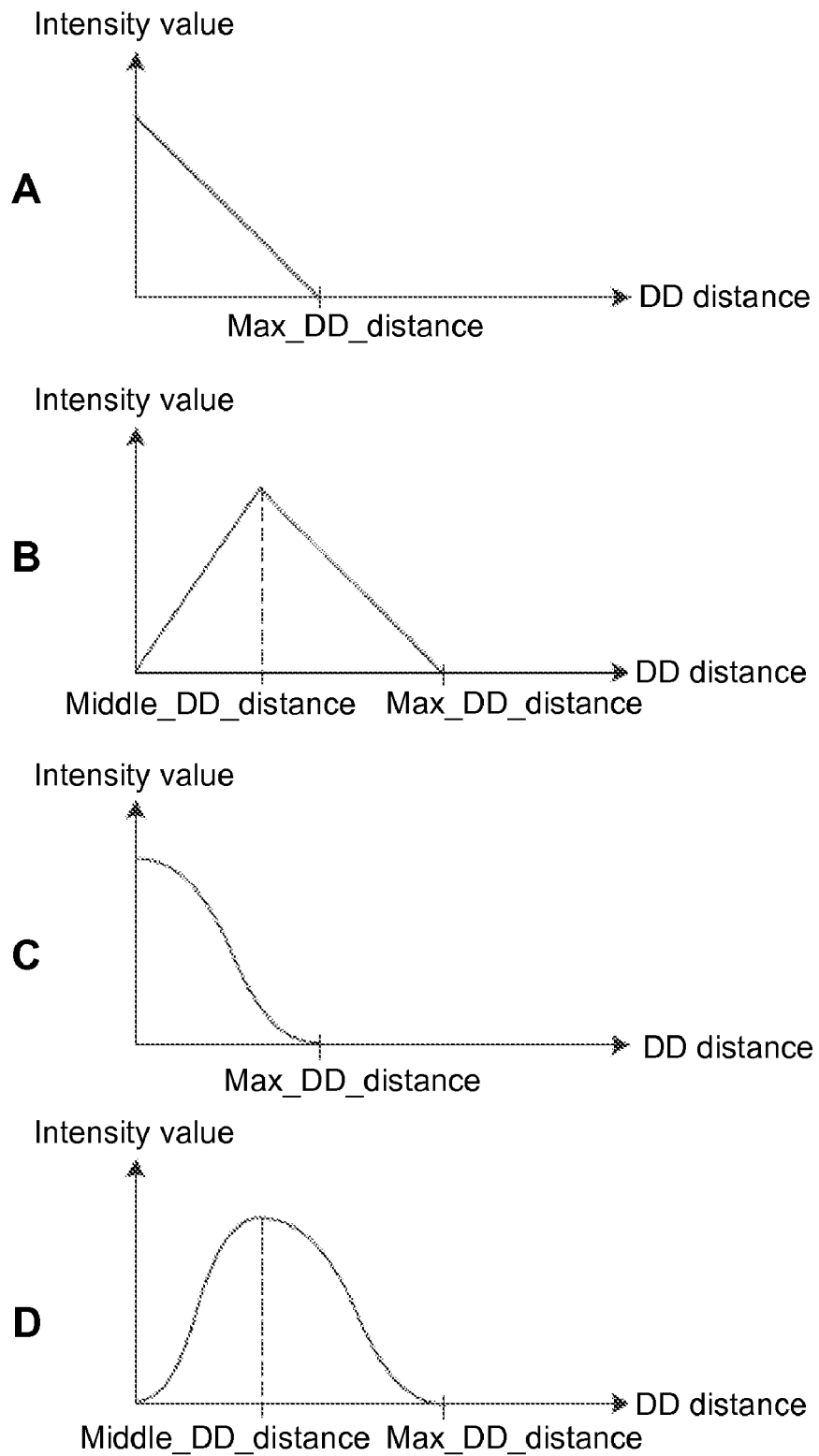
FIG. 8 shows four graphs illustrating different examples of how an intensity value can be set for the pixels of a shadow object according to the invention.

If $DD$ distance Max_$DD$_distance→intensity value= (Max_$DD$_distance−$DD$ distance)/Max_$DD$_distance where DD distance=depth at destination buffer pixel−depth of shadow object pixel The above definition of the intensity value for a shadow object pixel as a function of DD distance between that shadow object pixel and a corresponding destination buffer pixel is illustrated by graph A in FIG. 8.

In another embodiment of the invention, rendering of all objects is performed using another parameter related to the DD distance between the shadow object pixels and the corresponding destination buffer pixels, which parameter hereinafter will be referred to as Middle_DD_distance. The Middle_DD_distance parameter may be a preset parameter, a user-specified parameter or a parameter whose value is automatically calculated and set by the computer. According to this embodiment, the intensity value for a shadow object pixel increases when DD distance increases towards Middle_DD_distance, and then decreases when DD distance exceeds Middle_DD_distance and increases towards Max_DD_distance. The intensity value typically starts at zero when DD distance equals zero and ends at zero when DD distance exceeds Max_DD_distance.

The above definition of the intensity value for a shadow object pixel as a function of DD distance between that shadow object pixel and a corresponding destination buffer pixel is illustrated by graph B in FIG. 8.

An advantage of this embodiment is that when producing motion pictures or video, the shadows will be less prone to "popping". Popping means the visible artifact when an object pops out from behind of another object. By using an intensity value that starts from zero and gradually increases as DD distance approaches Middle_DD_distance, the shadow object will gradually appear and not appear abruptly in front of an original object.

In other embodiments, the intensity value for a shadow object pixel varies as a function of DD distance between that shadow object pixel and a corresponding destination buffer pixel according to a smooth curve. The graphs C and D in FIG. 8 illustrate examples of smooth intensity functions of DD distance.

According to one aspect of the invention, the computer program is adapted such that Max_DD_distance and Middle_DD_distance are automatically computed by the computer running the program. Max_DD_distance may be calculated based on the size of the shadow object and Middle_DD_distance may be calculated based on Max_DD_distance. For example, Max_DD_distance may be set to the size of the shadow object and Middle_DD_distance may be set to half of Max_DD_distance.

If the intensity value as a function of DD distance has its maximum value at a certain non-zero DD distance (as illustrated by the graphs B and D in FIG. 8) this may lead to a perceived offset of shadows in depth, i.e. a perceived offset towards or away from a viewer of the rendered image. Whether the offset will be an offset in depth towards or away from the viewer depends on the depth of the original object 2, 20 and the depth of the light source 3, 30 in the scene. Therefore, when the intensity value is determined by such a function, the 3D position at which the shadow object should be added can be calculated in a way that compensates for the "error" in perceived depth of the shadows in the rendered image. For example, the position of the shadow object can be calculated by determining a first position of the shadow object according to any of the previously described principles and then "move" the shadow particle to a final position by moving it in depth towards or away from the viewer by adding or subtracting a depth compensating value to/from the first position. The depth compensating value would hence affect the z-coordinate of the shadow object. The depth compensating value may be set by a user or it may be automatically calculated by the computer, for example by simply setting it to Middle_DD_distance.

In another embodiment, the user may select a subset of the light sources 3, 30 in the scene 1, the subset may be one or many light sources, and only the light sources in the subset are used for generating shadow objects in accordance with the described method. By selecting only the most prominent light-sources as subset, the rendered image will be of almost as good quality as if all light sources were included. This embodiment is advantageous in that it reduces the number of shadow objects that has to be added to the scene which makes the method faster and significantly reduces the computational power needed by the device running the computer program.

In another embodiment, a background image with a depth buffer is rendered into the destination buffer before rendering the objects. The benefit of this method is that the background image will also be shadowed.

In another embodiment, rendering of original objects is performed in a first phase by using any method that comprises setting a depth value for each pixel. For example this may be the standard rendering function that a graphics card (GPU) supports. The shadow objects are rendered in a second phase with one of the previously described methods. If an alpha channel is not available in the destination buffer, all pixels are assumed to be fully opaque. However, a depth channel is needed for this to work. Therefore, this embodiment only applies to the described methods that utilize a depth channel.

The benefit of this embodiment is that a standard (and usually very fast) GPU function can be used for rendering of original objects. The second pass of rendering of shadow objects may also be done in the GPU using a shader. A shader is a piece of code that the GPU can execute (very fast). In this case the shader would implement one of the described methods. A GPU is a chip or apparatus that is specifically made for generating computer graphics. Most modern PC's have a GPU card. This embodiment may be especially useful in computer games and other real-time applications.

In another embodiment of the invention, when objects are complex 3D models, for example it may be a 3D model of a car, or a detailed model of a person or an animal, the objects may be split into sub-objects before generating shadow objects. The splitting of objects may be done so that each main part of the object, for example an arm, becomes a separate object when generating shadow objects. The benefit of this embodiment is that if, for example, a person stands still in a scene, but moves his arm, the shadow object related to that arm will also move, and hence, realism will be increased.

In another embodiment of the invention, when there are very many original objects in a scene, the original objects may be clumped together before generating shadow objects. For example, if some original objects are close to each other in space, they may be considered as one original object when generating shadow objects. An advantage of this embodiment is that there will be fewer shadow objects and, therefore, the process of adding shadow objects to the scene will be faster and less computational power consuming than it would be if a shadow object was to be added for each original object (or more than one if the original object is illuminated by more than one light source).

As previously described, a shadow object associated with a certain original object and a certain light source is, according to an aspect of the invention, added at an offset distance, $d_{offset}$, behind the original object from the light source's point of view. No matter whether this initial offset distance is determined by a preset parameter, a user-specified parameter or calculated based on various parameters, the computer program according to the invention is preferably programmed to allow the user to adjust the initial offset distance of a shadow object 50 after it has been added to the scene. This may be achieved, e.g., by presenting a slide control which can be adjusted by the user, and/or a text field into which the user can input a desired offset distance, on a graphical user interface (GUI) of the computer program. According to one aspect of the invention, the user may choose whether he/she wants to adjust the offset distances for all shadow objects in the scene or for a subset (one or more) of the shadow objects in the scene. The latter may be achieved by allowing the user to indicate one or several original objects in the scene, e.g. by clicking on them using a computer mouse, and then adjust the offset distance for the shadow objects of the indicated original objects, for example by means of moving a slide control.

Preferably, the computer program includes similar functionality for allowing the user to adjust the size, opacity, color and/or the shape of the shadow objects after being added to the scene. Furthermore, the program may be adapted to allow the user to adjust the values of the above mentioned Max_DD_distance and Middle_DD_distance parameters after the shadow objects have been added to the scene. The size, opacity, color, Max_DD_distance and Middle_DD_distance may, for example, be adjusted by the user using a slide control or an input text filed as described above whereas the shape of the shadow object(s) may be adjusted, e.g., by choosing one of several predefined shapes, such as circles, squares, rectangles, triangles, ellipses, etc., from a drop-down menu or a group of icons presented to the user on the GUI of the computer program. In some cases, if the user changes the sizes of the shadow objects after they have been added to the scene, it is desirable to decrease the opacity of the shadow objects to keep the "amount" of shadow constant in the scene. Therefore, according to one embodiment of the invention, the computer program is adapted to automatically change the opacity of the shadow objects in response to a user-specified change in size of the shadow objects.

According to yet another aspect of the invention, the offset distance and/or the 3D position of a shadow object can be freely adjusted by a user after it has been automatically added to the scene. This can be achieved by the user by indicating the shadow object and moving it over the scene to the desired position, e.g. by "dragging and dropping" it to the desired position using a computer mouse.

Figure 9:
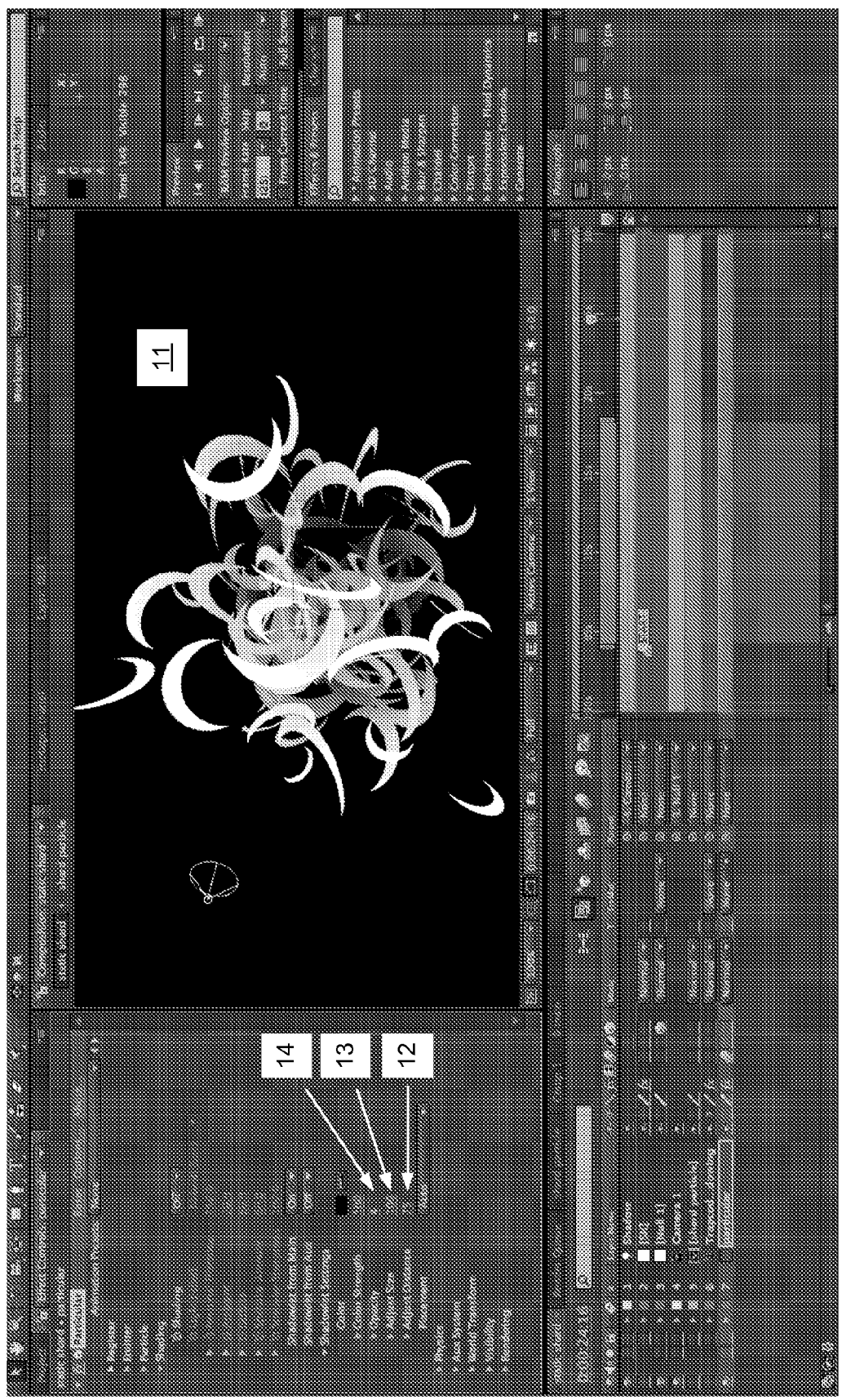
FIG. 9 shows an exemplary graphical user interface of a computer program according to the invention.

With reference now made to FIG. 9, an exemplary graphical user interface (GUI) of a computer program according to the invention is shown. The GUI comprises an image area 11 for displaying an image rendered from a scene which may be generated by the user or loaded into the computer program. Here the rendered image is seen to be the image shown in FIG. 6. On the left hand side, the GUI is seen to comprise a plurality of user controls of which some are denoted by reference numerals 12 to 14. These controls allow the user of the computer program to adjust different parameters which effect the way the shadow objects are added to the scene and hence the shadowing of the rendered image. Reference numeral 12 denotes a user control allowing the user to change the above described offset distance. This control is seen to be named "Adjust Distance" in the GUI. Reference numerals 13 and 14 denote user controls allowing the user to change the size and the opacity, respectively, of the shadow objects in the scene. The user may input a numerical value in the input text field of the respective user control or the user may click the small triangle in front of the name of the respective user control to display a slide control for changing the parameter value. When the user changes a parameter value, the computer program automatically re-generates the shadow objects for all original object/light source pairs in the scene and re-renders the scene into a new image which is displayed to the user in the image area 11.

Figure 10:
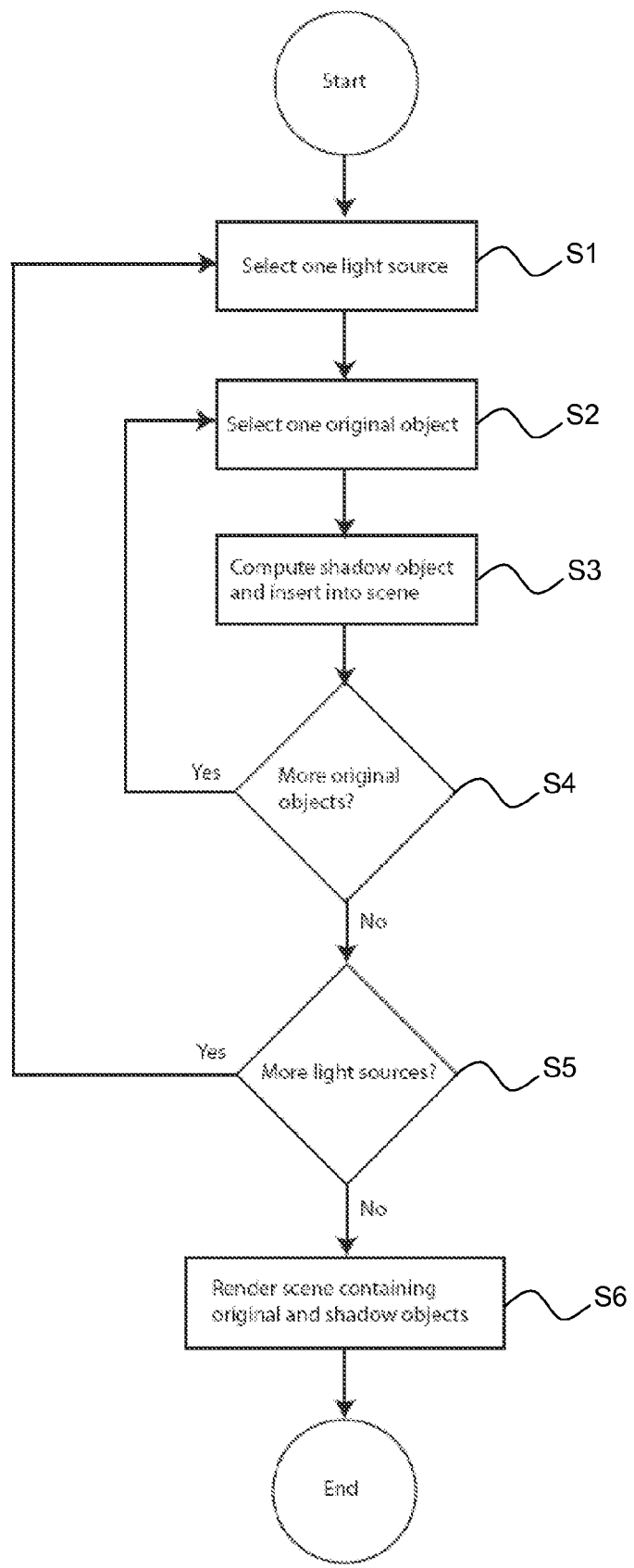
FIG. 10 is a flow chart illustrating a method according to an embodiment of the invention.

FIG. 10 is a flow chart illustrating a general method for adding shadow objects to a scene according to one embodiment of the invention.

In a first step, S1, a light source is selected. A light source may be automatically selected by the computer program by picking an item defined as a light source, or it may be manually selected by a user by, e.g., clicking on an item of the scene using the mouse. The method then proceeds to step S2.

In step S2, an original object is selected. Similar to the selection of a light source in step S1, the original object may be automatically selected by the computer program or manually selected by the user. The method then proceeds to step S3.

In step S3, a 3D position for a shadow object is calculated by the computer program (or rather by the computer based on instructions from the computer program) based on the 3D position of the selected original object and the 3D position of the selected light source. When the 3D position has been calculated, a shadow object is added to the scene at that position. The 3D position of the shadow object may be calculated according to any of the principles previously described. The method then proceeds to step S4.

In step S4, it is determined whether there are more original objects for which a shadow object should be added based on the currently selected light source. This step may also be performed automatically or manually. The computer program may for example be adapted to loop through all original objects for each light source in the scene (or vice versa). If there are more original objects for which a shadow object should be added based on the currently selected light source, the method returns to step S2. If not, the method proceeds to step S5.

In step S5, it is determined whether there are more light sources in the scene. If so, the method returns to step S1. If not, the method proceeds to step S6.

In step S6, the scene is rendered into an image from the viewer's point of view. Rendering of the scene can be performed in any way known in the art but preferably the shadow objects of the scene are rendered in accordance with any of the previously described principles. When the image is rendered, the method ends.

It should be appreciated that the various embodiments and aspects of the invention described herein can be combined in any conceivable way unless being strictly contradictory.

The invention claimed is:

1. A method for automatically adding shadows to particles in a particle system comprised in a computer-generated scene, wherein the scene further comprises at least a first light source and a viewer viewing the scene from a point of view, the method comprising:

calculating, using a processor and a graphical rendering unit, a first three dimensional [3D] position for a shadow object based on a 3D position of a first particle and a 3D position of said first light source; and adding a shadow object to said scene at said first 3D position, said first 3D position being calculated such that the shadow object is positioned behind said first particle from the first light source's point of view, at an offset distance $d_{offset}$, from the first particle, including calculating said offset distance, $d_{offset}$, based on the size of the first particle.

2. The method according to claim 1, wherein the shadow object is a two dimensional [2D] object.

3. The method according to claim 2, wherein the shadow object is a soft-edged circle.

4. The method according to claim 2, further comprising setting an opacity for the shadow object to a certain opacity value and/or the color of the shadow object to a certain color value.

5. The method according to claim 4, wherein said opacity value and/or color value is calculated based on said offset distance, $d_{offset}$.

6. The method according to claim 1, further comprising setting a size for the shadow object to a certain size value.

7. The method according to claim 6, wherein said size value is calculated based on the size of said first particle.

8. The method according to claim 6, wherein said size value is calculated based on the distance between said first light source and said first particle.

9. The method according to claim 1, wherein said offset distance, $d_{offset}$, is calculated based on the 3D position of a second particle located behind said first particle from the light source's point of view.

10. The method according to claim 1, further comprising rendering the scene into an image in a back-to-front order from said viewer's perspective, the rendering being performed by, for each pixel of the shadow object, compositing the pixel onto the corresponding destination buffer pixel while leaving the alpha value of the destination buffer pixel unchanged.

11. The method according to claim 10, wherein the rendering being performed by, for each pixel of the shadow object, multiplying the alpha value of the shadow object pixel with an intensity value, and compositing the shadow object pixel onto the corresponding destination buffer pixel while leaving the alpha value of the destination buffer pixel unchanged, the intensity value being a function of the distance between the depth of the shadow object pixel and the depth of the corresponding destination buffer pixel, which distance herein is referred to as the Depth Difference [DD] distance between these pixels.

12. The method according to claim 11, wherein the intensity value is set to zero if DD distance exceeds a certain threshold value, which threshold value is given by a parameter which herein is referred to as Max_DD_distance.

13. The method according to claim 12 wherein said intensity value is set to:

0 if DD distance>Max_DD_distance, and to (Max_DD_distance−DD distance)/Max_DD_distance if DD distance≦Max_DD_distance.

14. The method according to claim 1, wherein all method steps are repeated for each particle/light source pair in the scene.

15. The method according to claim 1, further comprising:
   taking as input parameter a user-generated parameter indicating the user's desire to change the offset distance, $d_{offset}$, and/or the opacity, the color and/or the shape of the shadow object after the shadow object has been added at said first 3D position;
   calculating a new offset distance, $d_{offset}$, and/or a new intensity value and/or a new color value and/or a new shape of the shadow object based on said input parameter, and
   moving and/or changing the properties of the shadow object based on the result of the calculation.

16. A non-transitory computer readable medium storing a computer program for a device comprising a processing unit and a graphical rendering unit capable of generating a scene, the scene comprising particles forming a particle system, at least a first light source, and a viewer viewing the scene from a point of view, the computer program comprising computer readable code which when run by the processing unit causes the device to perform a method comprising:
   automatically adding shadows to particles in a particle system comprised in a computer-generated scene, which scene further comprises at least a first light source and a viewer viewing the scene from a point of view;
   calculating a first three dimensional [3D] position for a shadow object based on a 3D position of a first particle and a 3D position of said first light source;
   adding a shadow object to said scene at said first 3D position, said first 3D position being calculated such that the shadow object is positioned behind said first particle from the first light source's point of view, at an offset distance $d_{offset}$ from the first particle, and
   calculating said offset distance, $d_{offset}$, based on the size of the first particle.

17. A device comprising a calculation means and a graphical rendering unit capable of generating a scene comprising particles forming a particle system, at least a first light source, and a viewer viewing the scene from a point of view, the device being adapted to:
   calculate a first three dimensional [3D] position for a shadow object based on a 3D position of a first particle and a 3D position of said first light source; and
   add a shadow object to said scene at said first 3D position, the device being adapted to calculate said first 3D position such that the shadow object is positioned behind said first particle from the first light source's point of view, at an offset distance, $d_{offset}$, from the first particle,
   the device adapted to calculate said offset distance, $d_{offset}$, based on the size of the first particle.

* * * * *